United States Patent
Lu et al.

(10) Patent No.: US 9,949,178 B2
(45) Date of Patent: *Apr. 17, 2018

(54) CARRIER AGGREGATION SCELL SELECTION FOR LTE-A

(71) Applicant: Telefonaktiebolaget L M Ericsson (publ), Stockholm (SE)

(72) Inventors: Guoqiang Lu, Kanata (CA); Lisa Boström, Solna (SE); Richard Liu, Ottawa (CA); Jamie Beuerman, Kanata (CA); Damitha Ranaweera, Kanata (CA); Edward Mah, Kanata (CA); Karl D. Mann, Ottawa (CA); Eric W. Parsons, Stittsville (CA); Iris Bujold, Ottawa (CA); Qingchao Liu, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/669,476

(22) Filed: Aug. 4, 2017

(65) Prior Publication Data

US 2017/0339607 A1 Nov. 23, 2017

Related U.S. Application Data

(63) Continuation of application No. 14/251,021, filed on Apr. 11, 2014, now Pat. No. 9,756,532.

(Continued)

(51) Int. Cl.
*H04W 36/00* (2009.01)
*H04W 52/02* (2009.01)
(Continued)

(52) U.S. Cl.
CPC ... *H04W 36/0061* (2013.01); *H04W 52/0212* (2013.01); *H04L 5/001* (2013.01); *H04L 5/0098* (2013.01); *H04W 36/06* (2013.01)

(58) Field of Classification Search
CPC ......... H04W 74/0833; H04W 72/0406; H04W 56/0045; H04W 72/0413; H04W 56/0005
See application file for complete search history.

(56) References Cited

U.S. PATENT DOCUMENTS 8,509,810 B2 8/2013 Sanders et al.
9,055,565 B2 * 6/2015 Kim ................... H04L 5/001
(Continued)

FOREIGN PATENT DOCUMENTS

EP 2326122 A1 11/2009
EP 2525597 A1 11/2012
(Continued)

OTHER PUBLICATIONS

Author Unknown, "3rd Generation Partnership Project; Technical Specification Group Radio Access Network; Evolved Universal Terrestrial Radio Access (E-UTRA); Physical channels and modulation (Release 10)," Technical Specification 36.211, Version 10.7.0, Feb. 2013, 3GPP Organizational Partners, 101 pages.

(Continued)

*Primary Examiner* — Dung Hong
(74) *Attorney, Agent, or Firm* — Withrow & Terranova, PLLC

(57) ABSTRACT

Systems and methods for Secondary Cell (sCell) selection for wireless devices operating according to a carrier aggregation scheme in a cellular communications network are disclosed. In one embodiment, a network node obtains a list of potential sCells for a wireless device. The network node blindly selects an sCell for the wireless device from the list of potential sCells. The network node then configures the (Continued)

wireless device with the selected sCell. Blindly selecting the sCell for the wireless device makes it possible to avoid the use of measurement gaps and reduce throughput loss, according to some embodiments.

20 Claims, 10 Drawing Sheets

Related U.S. Application Data

(60) Provisional application No. 61/880,689, filed on Sep. 20, 2013.

(51) Int. Cl.
    *H04L 5/00* (2006.01)
    *H04W 36/06* (2009.01)

(56) References Cited

U.S. PATENT DOCUMENTS

| | | | |
|---|---|---|---|
| 9,756,532 | B2* | 9/2017 | Lu ............... H04W 36/0061 |
| 2004/0067759 | A1 | 4/2004 | Spirito et al. |
| 2004/0116110 | A1* | 6/2004 | Amerga ............... H04W 48/16 455/422.1 |
| 2004/0121770 | A1 | 6/2004 | Tigerstedt et al. |
| 2004/0121773 | A1* | 6/2004 | O'Brien ............ H04W 36/0083 455/438 |
| 2004/0152471 | A1 | 8/2004 | MacDonald et al. |
| 2007/0225045 | A1 | 9/2007 | Jordan et al. |
| 2009/0279494 | A1 | 11/2009 | Halbauer et al. |
| 2010/0036161 | A1 | 2/2010 | Bontempelli et al. |
| 2010/0093356 | A1 | 4/2010 | Lee et al. |
| 2010/0167744 | A1 | 7/2010 | Grob-Lipski et al. |
| 2010/0240356 | A1 | 9/2010 | Lee et al. |
| 2011/0044285 | A1 | 2/2011 | Jang et al. |
| 2011/0117917 | A1 | 5/2011 | Gresset et al. |
| 2011/0299446 | A1 | 12/2011 | Chun et al. |
| 2012/0004010 | A1 | 1/2012 | Tamura et al. |
| 2012/0142361 | A1 | 6/2012 | Zhao et al. |
| 2012/0250578 | A1* | 10/2012 | Pani ............... H04W 48/12 370/254 |
| 2012/0276945 | A1 | 11/2012 | Chindapol et al. |
| 2012/0327878 | A1 | 12/2012 | Pedersen et al. |
| 2013/0022016 | A1 | 1/2013 | Wei |
| 2013/0100837 | A1 | 4/2013 | Iwamura |
| 2013/0130695 | A1 | 5/2013 | Ryu et al. |
| 2013/0194947 | A1* | 8/2013 | Ehsan ............... H04L 5/0098 370/252 |
| 2013/0229307 | A1 | 9/2013 | Chang et al. |
| 2014/0011513 | A1 | 1/2014 | Watts et al. |
| 2014/0140293 | A1 | 5/2014 | Sharma et al. |
| 2014/0187246 | A1* | 7/2014 | Jha ............... H04W 48/08 455/436 |
| 2014/0213263 | A1 | 7/2014 | Ryan et al. |
| 2014/0307623 | A1 | 10/2014 | Gheorghiu et al. |
| 2015/0087316 | A1 | 3/2015 | Boström et al. |
| 2015/0156773 | A1 | 6/2015 | Yao et al. |
| 2015/0172949 | A1* | 6/2015 | Lee ............... H04B 17/309 370/252 |
| 2015/0223125 | A1 | 8/2015 | Lu et al. |

FOREIGN PATENT DOCUMENTS

| | | |
|---|---|---|
| EP | 2775758 A1 | 9/2014 |
| WO | 2010036161 A1 | 4/2010 |
| WO | 2012154112 A1 | 11/2012 |
| WO | 2013028128 A1 | 2/2013 |
| WO | 2013063885 A1 | 5/2013 |

OTHER PUBLICATIONS

Author Unknown, "3rd Generation Partnership Project; Technical Specification Group Radio Access Network; Evolved Universal Terrestrial Radio Access (E-UTRA); Physical layer procedures (Release 8)," Technical Specification 36.213, Version 8.8.0, Sep. 2009, 3GPP Organizational Partners, 77 pages.

Author Unknown, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," Technical Specification 36.300, Version 10.11.0, Sep. 2013, 3GPP Organizational Partners, 195 pages.

Author Unknown, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," Technical Specification 36.300, Version 11.7.0, Sep. 19, 2013, 3GPP Organizational Partners, 209 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Technical Specification 36.300, Version 12.2.0, 3GPP Organizational Partners, Jun. 2014, 215 pages.

Author Unknown, "3rd Generation Partnership Project; Technical Specification Group Radio Access Network; Evolved Universal Terrestrial Radio Access (E-UTRA); Radio Resource Control (RCC); Protocol specification (Release 10)," Technical Specification 36.331, Version 10.11.0, Sep. 2013, 3GPP Organizational Partners, 308 pages.

Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.5.0, 3GPP Organizational Partners, Sep. 2013, 347 pages.

Author Unknown, "3rd Generation Partnership Project; Technical Specification Group Radio Access Network; Evolved Universal Terrestrial Radio Access (E-UTRA); LTE Positioning Protocol (LLP) (Release 10)," Technical Specification 36.355, Version 10.11.0, Dec. 2013, 3GPP Organizational Partners, 118 pages.

New Postcom, "R3-112498: Carrier Selection for Macro-Pica Scenario," 3rd Generation Partnership Project (3GPP), TSG RAN WG3 Meeting #73bis, Oct. 10-14, 2011, 3 pages, Zhuhai, China.

Nokia Siemens Networks et al., "R2-130124: User data rate enhancements with inter-site CA," 3rd Generation Partnership Project (3GPP), TSG-RAN WG2 Meeting #81, Jan. 28-Feb. 1, 2013, Malta, 4 pages.

Nsn et al., "R2-132339: Autonomous SCell Management for Dual Connectivity Cases," 3rd Generation Partnership Project (3GPP), TSG-RAN WG2 Meeting #83, Aug. 19-23, 2013, Barcelona, Spain, 4 pages.

Pedersen, Klaus I. et al., "Mobility Enhancements for LTE-Advanced Multilayer Networks with Inter-Site Carrier Aggregation," IEEE Communications Magazine, vol. 51, Issue 5, May 2013, IEEE, pp. 64-71.

Qualcomm Incorporated, "R4-130402: SCell Reporting Issues," 3rd Generation Partnership Project (3GPP), TSG-RAN WG4 Meeting #66, Jan. 28-Feb. 1, 2013, St. Julian's, Malta, 2 pages.

Shen, Zukang et al., "Overview of 3GPP LTE-Advanced Carrier Aggregation for 4G Wireless Communications," IEEE Communications Magazine, vol. 50, Issue 2, Feb. 2012, IEEE, pp. 122-130.

Non-Final Office Action for U.S. Appl. No. 14/251,021, dated Nov. 3, 2015, 15 pages.

Final Office Action for U.S. Appl. No. 14/251,021, dated Apr. 15, 2016, 16 pages.

Advisory Action and AFCP 2.0 Decision for U.S. Appl. No. 14/251,021, dated Jun. 15, 2016, 4 pages.

Non-Final Office Action for U.S. Appl. No. 14/251,021, dated Jul. 21, 2016, 17 pages.

Final Office Action for U.S. Appl. No. 14/251,021, dated Dec. 14, 2016, 20 pages.

(56) References Cited

OTHER PUBLICATIONS

Advisory Action for U.S. Appl. No. 14/251,021, dated Mar. 20, 2017, 3 pages.
Notice of Allowance and AFCP 2.0 Decision for U.S. Appl. No. 14/251,021, dated May 5, 2017, 8 pages.
Non-Final Office Action for U.S. Appl. No. 14/325,037, dated Jul. 21, 2015, 18 pages.
Final Office Action for U.S. Appl. No. 14/325,037, dated Jan. 14, 2016, 21 pages.
Advisory Action for U.S. Appl. No. 14/325,037, dated Apr. 6, 2016, 5 pages.
Non-Final Office Action for U.S. Appl. No. 14/325,037, dated Aug. 22, 2016, 22 pages.
Non-Final Office Action for U.S. Appl. No. 14/325,037, dated Feb. 22, 2017, 18 pages.
Notice of Allowance for U.S. Appl. No. 14/325,037, dated Jun. 1, 2017, 8 pages.
Non-Final Office Action for U.S. Appl. No. 14/171,338, dated Aug. 3, 2015, 36 pages.
Final Office Action for U.S. Appl. No. 14/171,338, dated Feb. 11, 2016, 43 pages.
Applicant-Initiated Interview Summary for U.S. Appl. No. 14/171,338, dated Mar. 18, 2016, 3 pages.
Advisory Action, Examiner-Initiated Interview Summary, and AFCP 2.0 Decision for U.S. Appl. No. 14/171,338, dated Apr. 27, 2016, 4 pages.
Non-Final Office Action for U.S. Appl. No. 14/171,338, dated Nov. 3, 2016, 42 pages.
Final Office Action for U.S. Appl. No. 14/171,338, dated Feb. 22, 2017, 42 pages.
Advisory Action and Examiner-Initiated Interview Summary for U.S. Appl. No. 14/171,338, dated Jun. 2, 2017, 3 pages.
Office Action for Korean Patent Application No. 10-2016-7010203, dated Jun. 29, 2017, 14 pages.
International Search Report and Written Opinion for PCT/IB2014/064292 dated Dec. 23, 2014, 14 pages.
Written Opinion for International Patent Application No. PCT/IB2014/064292, dated Aug. 27, 2015, 9 pages.
International Preliminary Report on Patentability for International Patent Application No. PCT/IB2014/064292, dated Dec. 4, 2015, 10 pages.
International Search Report and Written Opinion for International Patent Application No. PCT/IB2015/054699, dated Aug. 28, 2015, 16 pages.
Written Opinion for International Patent Application No. PCT/IB2015/054699, dated Jun. 10, 2016, 9 pages.
International Preliminary Report on Patentability for International Patent Application No. PCT/IB2015/054699, dated Sep. 14, 2016, 10 pages.
Invitation to Pay Additional Fees and Partial International Search Report for PCT/IB2015/050739, dated Apr. 7, 2015, 9 pages.
International Search Report and Written Opinion for International Patent Application No. PCT/IB2015/050739, dated Sep. 2, 2015, 22 pages.
International Preliminary Report on Patentability for International Patent Application No. PCT/IB2015/050739, dated Aug. 18, 2016, 15 pages.

\* cited by examiner

CARRIER AGGREGATION SCELL SELECTION FOR LTE-A

RELATED APPLICATIONS

This application is a continuation of patent application Ser. No. 14/251,021, filed Apr. 11, 2014, now U.S. Pat. No. 9,756,532, which claims the benefit of provisional patent application Ser. No. 61/880,689, filed Sep. 20, 2013, the disclosures of which are hereby incorporated herein by reference in their entireties.

FIELD OF THE DISCLOSURE

The present disclosure relates to a cellular communications network, and more particularly relates to secondary cell selection for wireless devices operating according to a carrier aggregation scheme.

BACKGROUND

Carrier aggregation was introduced in $3^{rd}$ Generation Partnership Project (3GPP) Long Term Evolution (LTE) Advanced Release 10 (LTE Rel-10) as an LTE-Advanced feature. Using carrier aggregation, multiple component carriers (CCs) can be aggregated and jointly used for transmission to or from a single wireless device. Each component carrier can have any of the LTE Release 8 (LTE Rel-8) bandwidths: 1.4, 3, 5, 10, or 20 Megahertz (MHz). Up to five component carriers can be aggregated to give a maximum aggregated bandwidth of 100 MHz. Further, each component carrier uses the LTE Rel-8 structure to provide backward compatibility (i.e., each component carrier appears as an LTE Rel-8 carrier).

FIG. 1 illustrates one example of carrier aggregation. In this example, cells 10-0 through 10-4, having carrier frequencies F0, F1, F2, F3, and F4, respectively, can be aggregated. In this example, the cells 10-0 through 10-4 are transmitted by a single base station 12. With respect to a particular wireless device, one of the cells 10-0 through 10-4 serves as a Primary Cell (pCell) of the wireless device, where the pCell handles Radio Resource Control (RRC) connection. The component carrier of the pCell is referred to as the Primary Component Carrier (PCC). Other cells aggregated with the pCell for the wireless device are referred to as Secondary Cells (sCells) having corresponding Secondary Component Carriers (SCCs). All of the aggregated cells for the wireless device are referred to as serving cells of the wireless device.

The coverage areas of the cells 10-0 through 10-4 may differ either due to different component carrier frequencies or due to power planning on the different component carriers. In the example of FIG. 1, the cell 10-0 has the largest coverage area and serves as the pCell for wireless devices A, B, C, D, and F located in the cell 10-0. The cells 10-1 through 10-4 have successively smaller coverage areas and serve as sCells for wireless devices B through F. In this example, the wireless device A has no sCell coverage, the wireless device B has sCell coverage for one sCell (namely cell 10-1), the wireless device C has sCell coverage for two sCells (namely cells 10-1 and 10-2), the wireless device D has sCell coverage for three sCells (namely cells 10-1, 10-2, and 10-3), and the wireless device F has sCell coverage for four sCells (namely cells 10-1, 10-2, 10-3, and 10-4). Therefore, depending on the position of a wireless device within the pCell, the wireless device may have no sCell coverage or may have coverage of one or more sCells.

For a wireless device connected to the pCell on carrier frequency F0 (e.g., wireless device A), the base station 12 normally starts inter-frequency layer 3 (L3) measurements on candidate sCell(s) in order to determine whether the wireless device has any sCell coverage. For instance, the base station 12 normally starts inter-frequency L3 measurements such as, for example, a measurement that triggers an A4 event when the inter-frequency L3 measurement for an sCell becomes better than a threshold. In the LTE specifications, an A4 event occurs when a neighboring cell becomes better than a threshold, which is referred to herein as an A4 threshold. In the example of FIG. 1, with a proper A4 threshold, an A4 event will trigger on carrier frequency F1 for the wireless device B to thereby indicate that the wireless device B has sCell coverage via the cell 10-1. In contrast, for the wireless device F, an A4 event will trigger on carrier frequencies F1, F2, F3, and F4 to thereby indicate that the wireless device F has sCell coverage via cells 10-1, 10-2, 10-3, and 10-4. Based on the measurement event triggering, one or more sCells are selected and configured for each wireless device having sCell coverage.

One issue with this normal sCell selection process is that the inter-frequency measurements may require measurement gaps. Measurement gaps are periods during which there is no traffic in both the uplink and downlink directions. Using measurement gaps to perform the inter-frequency measurements for sCell selection will incur 7-15% throughput loss on configured cells depending on the gap pattern configured.

Another issue with the normal sCell selection process is that to perform any measurements (inter-frequency or intra-frequency, gap or gapless measurements) on the candidate sCells, the parameter s-Measure may have to be disabled. As defined in the LTE specifications, when the pCell's Reference Signal Received Power (RSRP) measurement is not below s-Measure, the wireless device is not required to perform any neighbor cell measurements, including the measurements on the candidate sCell(s), in order to save battery power. Thus, in order to guarantee that the measurements on the candidate sCell(s) are being performed by the wireless devices A, B, C, D, and F when using the normal sCell selection process, the s-Measure parameter will have to be disabled, which will cause increased wireless device battery consumption.

In light of the discussion above, there is a need for systems and methods for improved sCell selection.

SUMMARY

Systems and methods for Secondary Cell (sCell) selection for wireless devices operating according to a carrier aggregation scheme in a cellular communications network are disclosed. In one embodiment, a network node obtains a list of potential sCells for a wireless device. The network node blindly selects an sCell for the wireless device from the list of potential sCells. The network node then configures the wireless device with the selected sCell. Blindly selecting the sCell for the wireless device can avoid the use of measurement gaps and reduce throughput loss, according to some embodiments.

In one embodiment, blindly selecting the sCell includes selecting the sCell from the list of potential sCells based on a round-robin strategy. Further, in one embodiment, the round-robin strategy is started in the list of potential sCells at a position in the list that is different from a position at which a previous iteration of the round-robin strategy for selecting a previous sCell stopped. In another embodiment, the round-robin strategy is started in the list of potential sCells at a position in the list immediately succeeding a position at which a previous iteration of the round-robin strategy for selecting a previous sCell stopped. In still another embodiment, blindly selecting the sCell includes selecting the sCell from the list of potential sCells based on a random selection strategy.

In one embodiment, after the network node configures the wireless device with the selected sCell, the network node receives an indication from the wireless device that a neighboring cell of the selected sCell is better than the selected sCell. In response to receiving the indication, the network node configures the wireless device with the neighboring cell as an sCell of the wireless device. Further, in one embodiment, the network node deconfigures the selected sCell as an sCell of the wireless device. In one embodiment, the indication is an indication of an A4 event. In another embodiment, the indication is an indication of an A6 event.

In one embodiment, after configuring the wireless device with the selected sCell, the network node receives an indication from the wireless device that the selected sCell is not an acceptable sCell for the wireless device. In response, the network node blindly selects a new sCell for the wireless device from the list of potential sCells for the wireless device. The network node then configures the wireless device with the new sCell selected for the wireless device. In one embodiment, the network node deconfigures the selected sCell as an sCell of the wireless device. In one embodiment, the indication is an indication of an A2 event.

In one embodiment, after configuring the wireless device with the selected sCell, the network node receives an indication from the wireless device that the selected sCell is not an acceptable sCell for the wireless device. In response, the network node monitors for an indication from the wireless device that a neighboring cell of the selected sCell is better than the selected sCell. If the indication that the neighboring cell of the selected sCell is better than the selected sCell is not received within a defined period of time, the network node blindly selects a new sCell for the wireless device from the list of potential sCells for the wireless device. This blind selection excludes potential sCells that operate at a frequency that is the same as a frequency of operation of the selected sCell. The network node then configures the wireless device with the new sCell selected for the wireless device. In one embodiment, the indication from the wireless device that the selected sCell is not an acceptable sCell for the wireless device is an indication of an A2 event and the indication that the neighboring cell of the selected sCell is better than the selected sCell is an indication of an A4 event or an A6 event.

In one embodiment, the list of potential sCells is sorted by a frequency of operation of the potential sCells to thereby provide a plurality of frequency groups within the list. Also, blindly selecting the sCell includes blindly selecting the sCell from one frequency group according to a round-robin strategy. After configuring the wireless device with the selected sCell, the network node receives an indication from the wireless device that the selected sCell is not an acceptable sCell for the wireless device. In response, the network node monitors for an indication from the wireless device that a neighboring cell of the selected sCell is better than the selected sCell. If the indication that the neighboring cell of the selected sCell is better than the selected sCell is not received within a defined period of time, the network node blindly selects a new sCell for the wireless device from a next frequency group in the list of potential sCells according to the round-robin strategy. The network node then configures the wireless device with the new sCell selected for the wireless device.

In one embodiment, after configuring the wireless device with the selected sCell, the network node monitors for at least one indication from the wireless device. The at least one indication can be an indication that the selected sCell is an acceptable sCell for the wireless device, an indication that the selected sCell is not an acceptable sCell for the wireless device, or an indication that a neighboring cell of the selected sCell is better than the selected sCell. If the at least one indication is not received within a defined period of time, the network node blindly selects a new sCell for the wireless device from the list of potential sCells for the wireless device. The network node then configures the wireless device with the new sCell selected for the wireless device.

In one embodiment, obtaining the list of potential sCells includes determining the list based on an intersection of cells available to be configured as an sCell and capabilities of the wireless device. Further, in one embodiment, the list of potential sCells is determined based on an intersection of a frequency of operation of cells available to be configured as an sCell and frequency capabilities of the wireless device.

In one embodiment, the list of potential sCells for the wireless device includes potential sCells in an order that is different from an order of potential sCells comprising a second list of potential sCells for a second wireless device.

In one embodiment, the network node weights the list of potential sCells before blindly selecting the sCell. Further, in one embodiment, weighting the list of potential sCells before blindly selecting the sCell includes adding one or more duplicate entries into the list of potential sCells. In another embodiment, weighting the list of potential sCells before blindly selecting the sCell includes adjusting a probability of selection for one or more entries in the list of potential sCells.

In one embodiment, the network node is a radio network node. Further, in one embodiment, the radio network node is a base station.

In one embodiment, a network node for configuring a wireless device with an sCell includes a processor and a memory. The memory contains instructions executable by the processor. By executing the instructions, the network node is operative to obtain the list of potential sCells for the wireless device. The network node is also operative to blindly select an sCell for the wireless device from the list of potential sCells. The network node is also operative to configure the wireless device with the selected sCell.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods for Secondary Cell (sCell) selection for wireless devices operating according to a carrier aggregation scheme in a cellular communications network are disclosed. In one embodiment, a network node obtains a list of potential sCells for a wireless device. The network node blindly selects an sCell for the wireless device from the list of potential sCells. The network node then configures the wireless device with the selected sCell. Blindly selecting the sCell for the wireless device can avoid the use of measurement gaps and reduce throughput loss, according to some embodiments.

Figure 1:
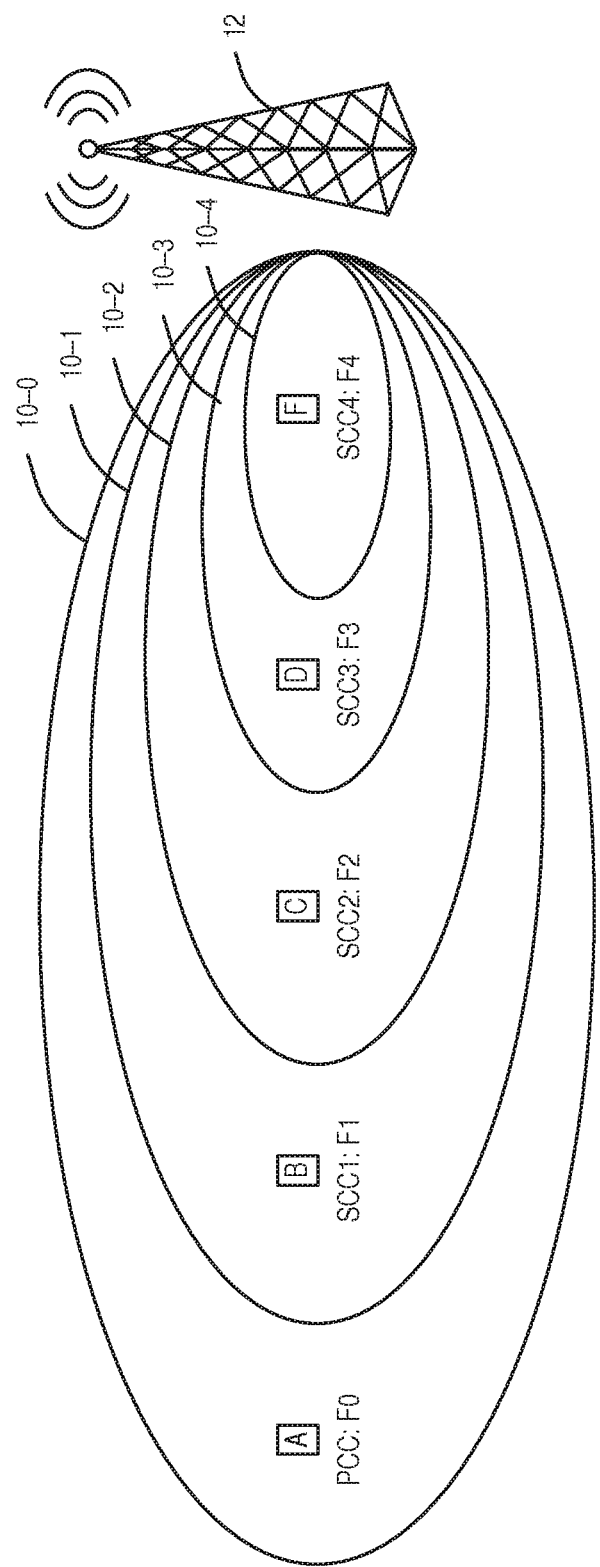
FIG. 1 illustrates one example of carrier aggregation in a cellular communications network.
Figure 2:
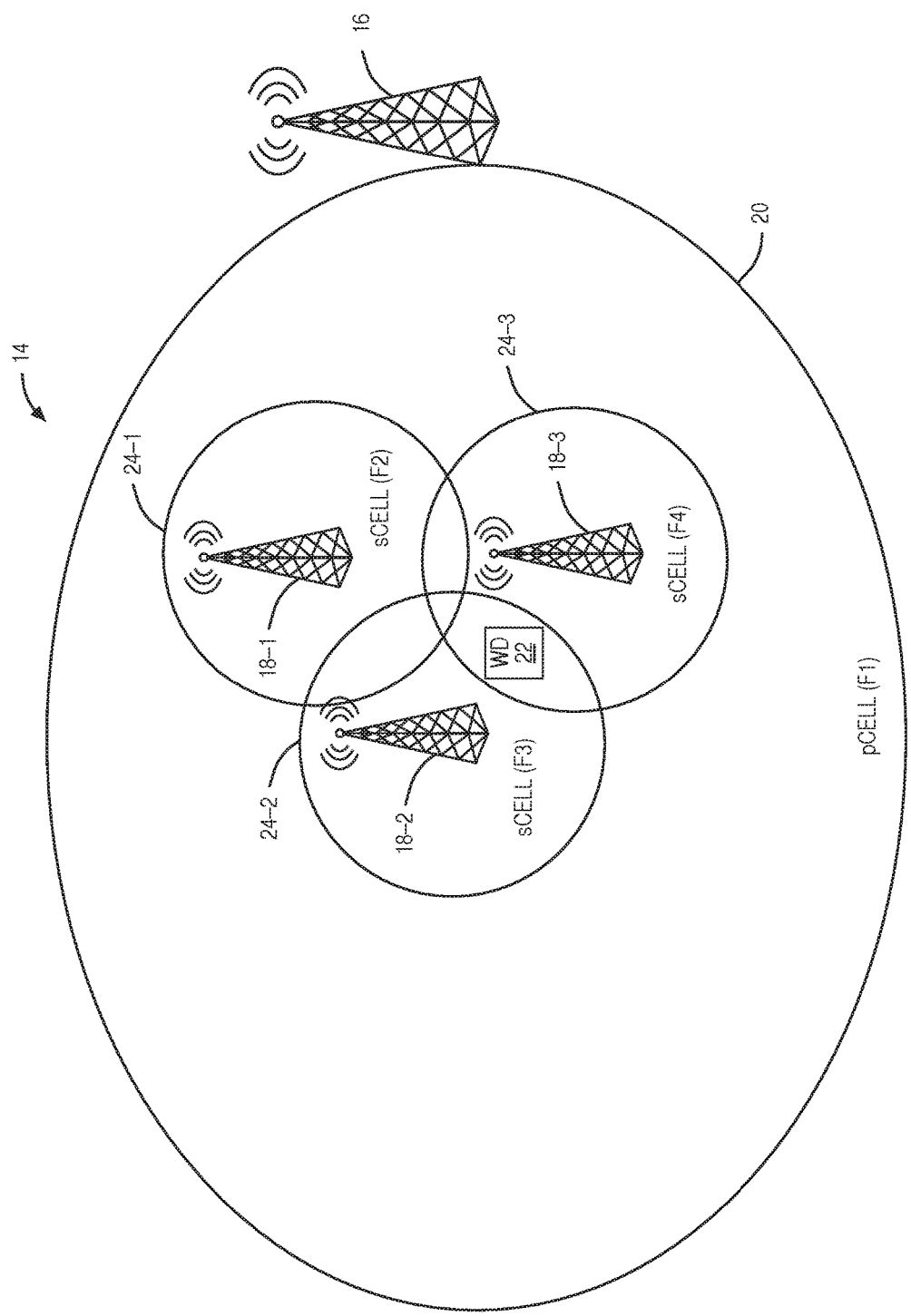
FIG. 2 illustrates a cellular communications network in which a base station performs Secondary Cell (sCell) selection for wireless devices according to one embodiment of the present disclosure.

In this regard, FIG. 2 illustrates a cellular communications network 14 in which sCell selection is performed according to one embodiment of the present disclosure. Note that in many of the embodiments described herein, the cellular communications network 14 is a 3$^{rd}$ Generation Partnership Project (3GPP) Long Term Evolution (LTE) or LTE-Advanced cellular communications network and, as such, LTE or LTE-Advanced terminology is sometimes used. However, the concepts disclosed herein can be applied to any suitable wireless network (e.g., cellular communications network) that utilizes carrier aggregation and in which sCell selection is desired.

As illustrated, the cellular communications network 14 includes a base station 16, which in LTE terminology is referred to an evolved Node B (eNB) 16, and a number of Remote Radio Heads (RRHs) 18-1 through 18-3 (generally referred to herein collectively as RRHs 18 and individually as RRH 18). The RRHs 18 are RRHs of the base station 16. In this example, the base station 16 serves a cell that is a serving cell, and more particularly a Primary Cell (pCell) 20, for a wireless device 22 located within a coverage area of the pCell 20. As used herein, the coverage area of a cell (e.g., the coverage area of the pCell 20) is a geographic area covered by the cell. Cells of the RRHs 18-1 through 18-3 are sCells 24-1 through 24-3 (generally referred to herein collectively as sCells 24 and individually as sCell 24) may be small cells, according to one embodiment. As discussed below, one or more of the sCells 24 are selected and configured as serving sCells 24 of the wireless device 22. Note that while the macro cell 20 is the pCell in this example, the macro cell 20 may, in another example, be an sCell. For instance, using the wireless device 22 as an example, the small cell 24-2 may alternatively be the pCell for the wireless device 22 and the macro cell 20 may alternatively be an sCell for the wireless device 22.

Figure 3:
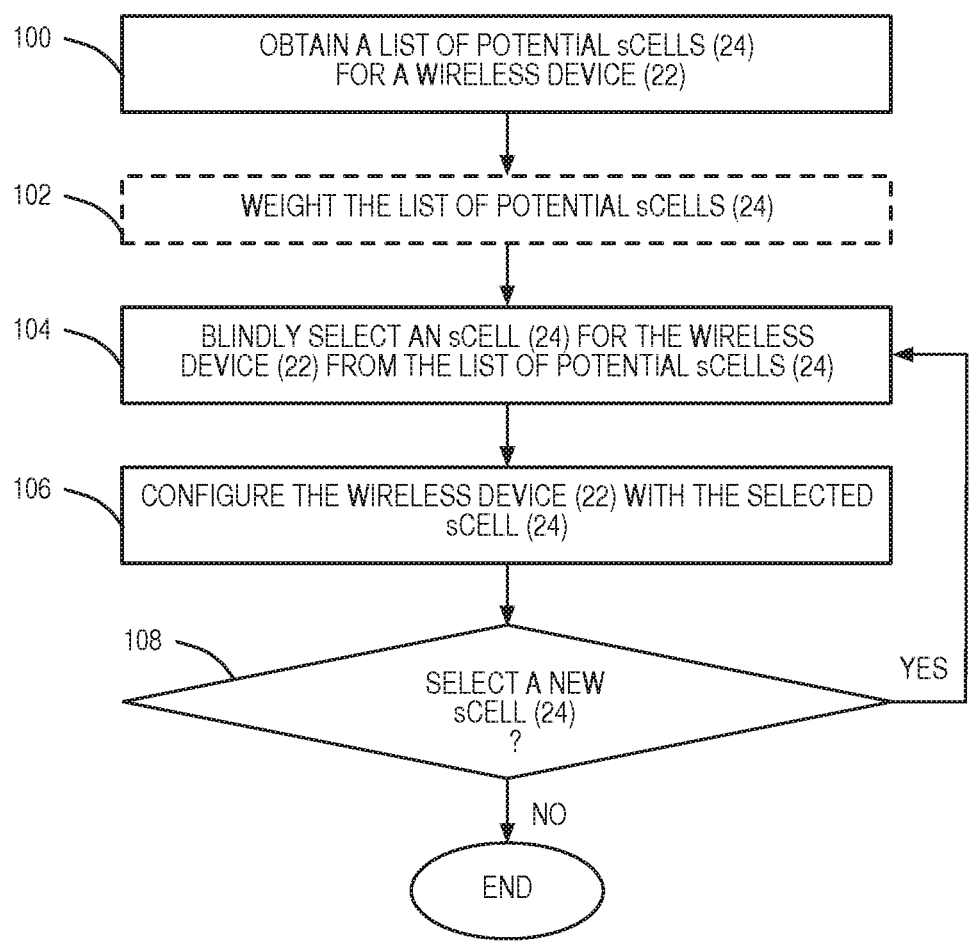
FIG. 3 illustrates the operation of a network node for configuring a wireless device with an sCell according to one embodiment of the present disclosure.

FIG. 3 illustrates the operation of a network node for selecting one or more of the sCells 24 for the wireless device 22 and configuring the wireless device 22 with the selected sCell(s) 24 according to one embodiment of the present disclosure. The network node may be any suitable network node (e.g., the base station 16, any suitable radio access network node, or any suitable core network node (e.g., a mobility management entity)). First, the network node obtains a list of potential sCells 24 for the wireless device 22 (step 100). This list of potential sCells 24 can be obtained in several ways. In one embodiment, the network node obtains a list of cells (e.g., neighboring cells) that are available to be configured as sCells 24 and capabilities of the wireless device 22. The network node then obtains the list of potential sCells 24 based on an intersection of cells available to be configured as an sCell 24 and the capabilities of the wireless device 22 (i.e., the list of potential sCells 24 is a list of cells that are both available to be configured as sCells 24 and have one or more parameters (e.g., frequency band or frequency of operation) that match the capabilities of the wireless device 22 (e.g., frequency band(s) or frequency(ies) of operation of the wireless device 22). The network node may have many cells, but not all of the cells may necessarily be available to be used as sCells 24. Furthermore, although wireless devices 22 are increasingly supporting more frequencies, there are often still frequencies that are not supported by a given wireless device 22.

After obtaining the list of potential sCells 24, the network node may optionally weight the list of potential sCells 24 (step 102). This weighting serves to make the selection of one or more sCells 24 more likely and/or to make the selection of one or more sCells 24 less likely. This can be accomplished in various ways depending on the particular implementation. In one embodiment, weighting the list of potential sCells 24 includes adding one or more duplicate entries into the list of potential sCells 24. In another embodiment, weighting the list of potential sCells 24 before blindly selecting the sCell 24 includes adjusting a probability of selection for one or more entries in the list of potential sCells 24.

Next, the network node blindly selects an sCell 24 for the wireless device 22 from the list of potential sCells 24 (step 104). As used herein, "blindly selecting" means that the sCell 24 is selected without necessarily having any indication of the sCell's suitability to serve as an sCell 24 for the wireless device 22, e.g., without first obtaining any signal quality measurement, such as an inter-frequency layer 3 (L3) measurement. By not requiring the wireless device 22 to make an L3 measurement of the potential sCell 24 before selecting the potential sCell 24, the need for measurement gaps at the wireless device 22 can be avoided. A measurement gap occurs when the wireless device 22 temporarily suspends one or more current connections (e.g., a connection to the pCell 20) in order to make the L3 measurement of the potential sCell 24. Using measurement gaps to perform the inter-frequency measurements for sCell 24 selection will incur 7-15% throughput loss on configured cells depending on the gap pattern configured. By blindly selecting the sCell 24, this throughput loss can be avoided and the increased power consumption necessary to perform measurements such as L3 measurements can be avoided as well, according to some embodiments.

In one embodiment, blindly selecting the sCell 24 includes selecting the sCell 24 from the list of potential sCells 24 based on a random selection strategy. In another embodiment, blindly selecting the sCell 24 includes selecting the sCell 24 from the list of potential sCells 24 based on a round-robin strategy. As used herein, a round-robin strategy involves selecting sCells 24 in a sequential order. In some embodiments, the list of potential sCells 24 is sorted by frequency of operation. Further, in one embodiment, the round-robin strategy is started in the list of potential sCells 24 at a position in the list that is different from a position at which a previous iteration of the round-robin strategy stopped. In one embodiment, the round-robin strategy is started in the list of potential sCells 24 at a position in the list immediately succeeding a position at which a previous iteration of the round-robin strategy stopped. It is also possible to start the round-robin strategy at a random position in the list of potential sCells 24. In these ways, the sCells 24 selected for the wireless device 22 may be different from the sCells 24 selected for other wireless devices 22 and the network node may avoid retrying sCells 24 that have recently been selected.

In addition, in some embodiments, starting the round-robin strategy at a random position in the list of potential sCells 24 may be implemented to avoid the problem of load imbalancing. Load imbalancing occurs when a relative few sCells 24 are disproportionately chosen to be configured for wireless devices 22, while other potential sCells 24 are not chosen. In the simplest scenario, each wireless device 22 is provided with the same list of potential sCells 24 and each round-robin strategy is started in the list of potential sCells 24 at the same position in the list. In this scenario, every wireless device 22 for which the first sCell 24 in the list would be appropriate will configure that sCell 24. Consequently, the sCell 24 that is last in the list will be very unlikely to be configured as an sCell 24 for a wireless device 22. Thus, the load on the different sCells 24 will be imbalanced. In some cases, this will lead to decreased quality of service for the wireless devices 22 configured to use the overused sCell 24, while resources available for the less used sCells 24 will not be utilized.

After blindly selecting an sCell 24 for the wireless device 22, the network node configures the wireless device 22 with the selected sCell 24 (step 106). In LTE, this configuration is accomplished by sending an appropriate Radio Resource Control (RRC) message to the wireless device 22. After configuring the wireless device 22 with the selected sCell 24, the network node determines whether a new sCell 24 needs to be selected (step 108). More specifically, as discussed previously in regard to step 104, since the configured sCell 24 was blindly selected, it may not be an acceptable sCell 24 for the wireless device 22. As used herein, an sCell 24 is not an acceptable sCell 24 for the wireless device 22 if either the wireless device 22 fails to connect to the sCell 24 or if the wireless device 22 indicates that the signal quality from the sCell 24 is insufficient. According to one embodiment, if the network node determines that it should select a new sCell 24 (step 108), the network node returns to step 104 and blindly selects an sCell 24 for the wireless device 22 from the list of potential sCells 24. Otherwise, the network node ends the sCell 24 selection process.

Figure 4:
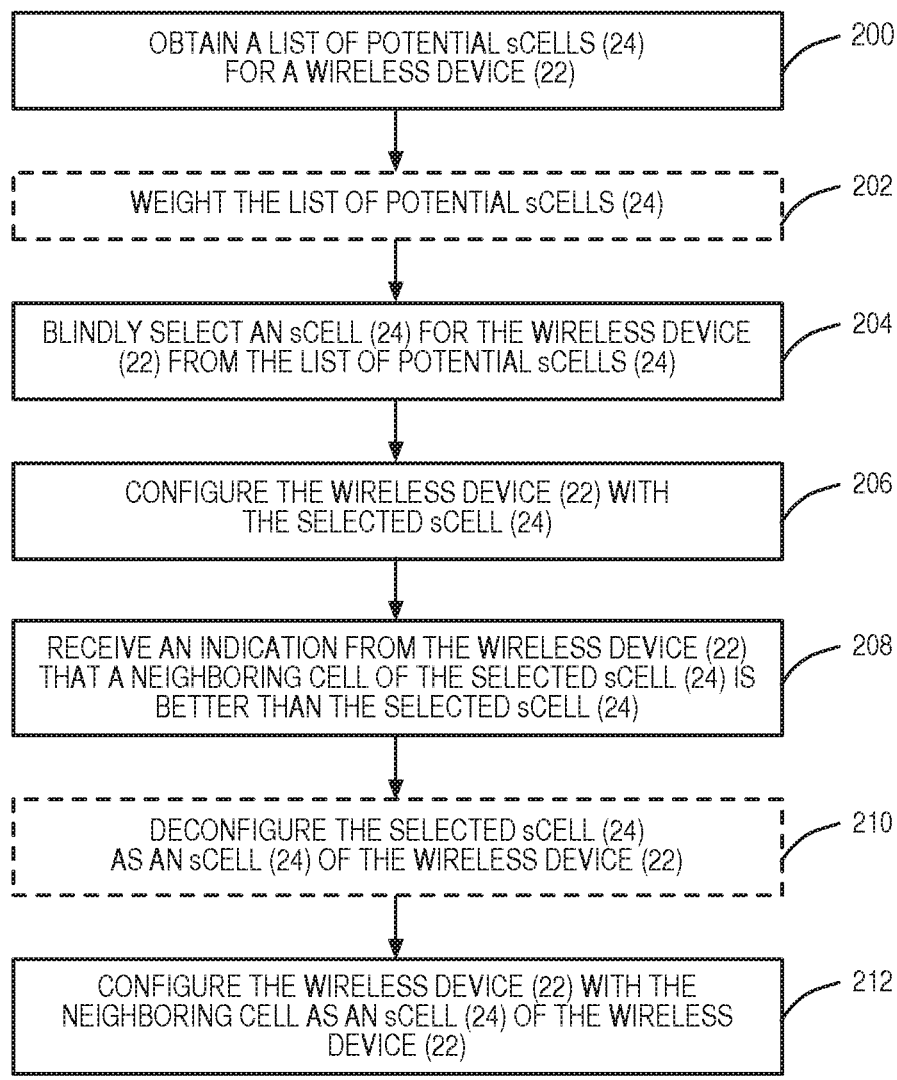
FIG. 4 illustrates the operation of a network node, including receiving an indication regarding a neighboring cell of a selected sCell according to one embodiment of the present disclosure.

FIG. 4 illustrates the operation of a network node for selecting one or more of the sCells 24 for the wireless device 22 and configuring the wireless device 22 with the selected sCell(s) 24 according to one embodiment of the present disclosure. This embodiment is similar to that of FIG. 3, but in this embodiment, after configuring the wireless device 22 with the selected sCell 24, the network node receives an indication from the wireless device 22 that a neighboring sCell 24 of the selected sCell 24 is better than the selected sCell 24. As discussed above, the network node obtains a list of potential sCells 24 for the wireless device 22 (step 200), optionally weights the list of potential sCells 24 (step 202), blindly selects an sCell 24 for the wireless device 22 from the list of potential sCells 24 (step 204), and configures the wireless device 22 with the selected sCell 24 (step 206).

After configuring the wireless device 22 with the selected sCell 24, the network node receives an indication from the wireless device 22 that a neighboring cell of the selected sCell 24 is better than the selected sCell 24 (step 208). In one embodiment, the indication is an indication of an A4 event. In the LTE specifications, an A4 event occurs when a neighboring cell of, in this example, the selected sCell 24 becomes better than a threshold, which is referred to herein as an A4 threshold. In another embodiment, the indication is an indication of an A6 event. In the LTE specifications, an A6 event occurs when a neighboring cell of, in this example, the selected sCell 24 at the same frequency becomes an offset better than the selected sCell 24. This event was added in LTE Rel-10 specifically to facilitate carrier aggregation.

Depending on the particular implementation, in response to the indication from the wireless device 22, the network node optionally deconfigures the selected sCell 24 as an sCell 24 of the wireless device 22 (step 210). In LTE, this deconfiguration is accomplished by sending an appropriate RRC message to the wireless device 22. In this embodiment, in response to receiving the indication that the neighboring cell is better than the selected sCell 24, the network node configures the wireless device 22 with the neighboring cell as an sCell 24 for the wireless device 22 (step 212). This newly configured sCell 24 should be at least as good or better than the previously configured sCell 24. Note that before configuring the neighboring cell as an sCell 24 of the wireless device 22, the network node may determine whether the neighboring cell satisfies one or more predefined criteria. For example, the network node may first confirm that the neighboring cell is available for configuration as an sCell 24 and that one or more parameters of the neighboring cell match the capabilities of the wireless device 22. This may be done by, e.g., determining whether the neighboring cell is in the list of potential sCells 24 for the wireless device 22.

Figure 5:
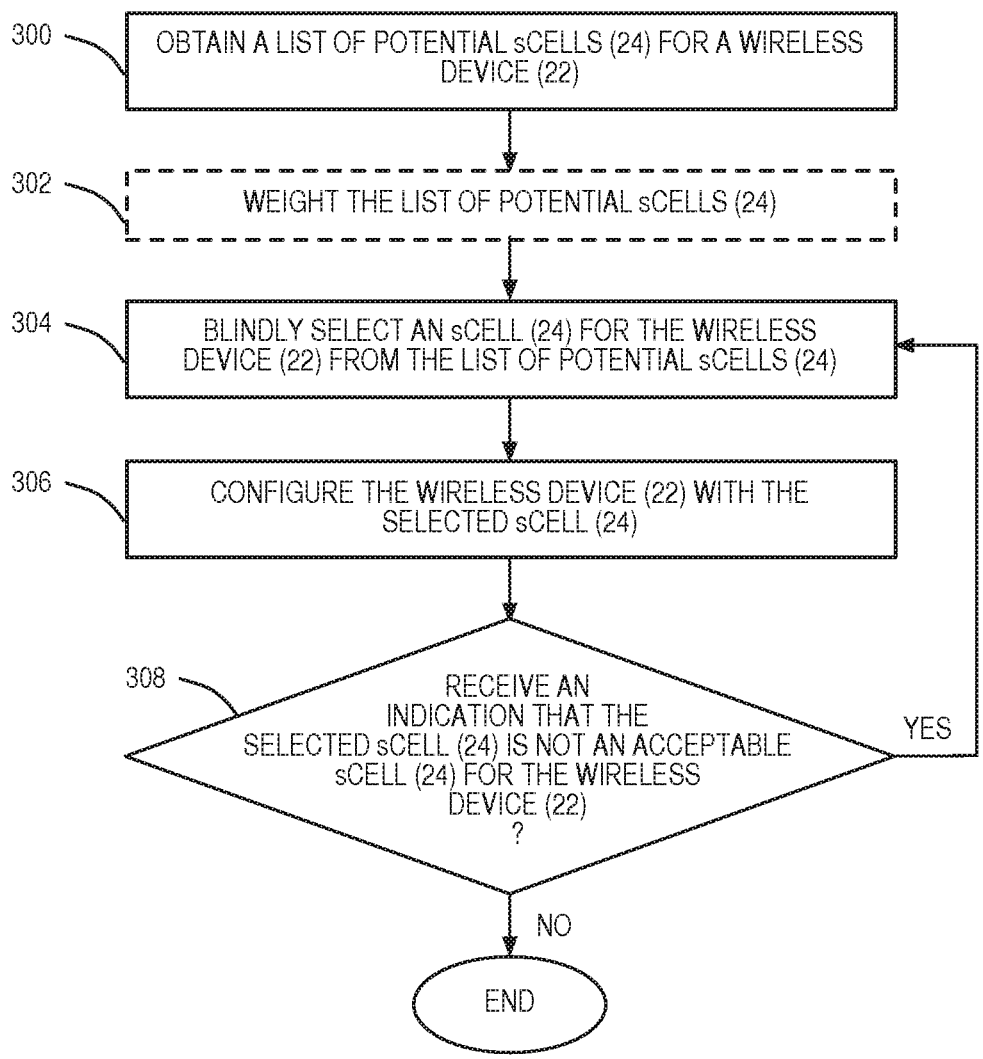
FIG. 5 illustrates the operation of a network node, including receiving an indication that a selected sCell is not acceptable according to one embodiment of the present disclosure.

FIG. 5 illustrates the operation of a network node for selecting one or more of the sCells 24 for the wireless device 22 and configuring the wireless device 22 with the selected sCell(s) 24 according to another embodiment of the present disclosure. This embodiment is similar to those of FIGS. 3 and 4, but in this embodiment, after configuring the wireless device 22 with the selected sCell 24, the network node receives an indication that the selected sCell 24 is not an acceptable sCell 24 for the wireless device 22. As discussed above, the network node obtains a list of potential sCells 24 for the wireless device 22 (step 300), optionally weights the list of potential sCells 24 (step 302), blindly selects an sCell 24 for the wireless device 22 from the list of potential sCells 24 (step 304), and configures the wireless device 22 with the selected sCell 24 (step 306).

Since the configured sCell 24 was blindly selected, it may not be an acceptable sCell 24 for the wireless device 22. If the network node receives an indication from, e.g., the wireless device 22 that the selected sCell 24 is not an acceptable sCell 24 for the wireless device 22 (step 308), the network node returns to step 304 and blindly selects a new sCell 24 for the wireless device 22 from the list of potential sCells 24. Otherwise, the network node ends the sCell 24 selection process. In one embodiment, the indication from the wireless device 22 that the selected sCell 24 is not an acceptable sCell 24 for the wireless device 22 is an indication of an A2 event. In the LTE specifications, an A2 event occurs when a serving cell, which in this example is the selected and configured sCell 24, becomes worse than a threshold, which is referred to herein as an A2 threshold. In another embodiment, the indication from the wireless device 22 that the selected sCell 24 is not an acceptable sCell 24 for the wireless device 22 is an indication that the wireless device 22 failed to connect to the selected sCell 24.

Figure 6:
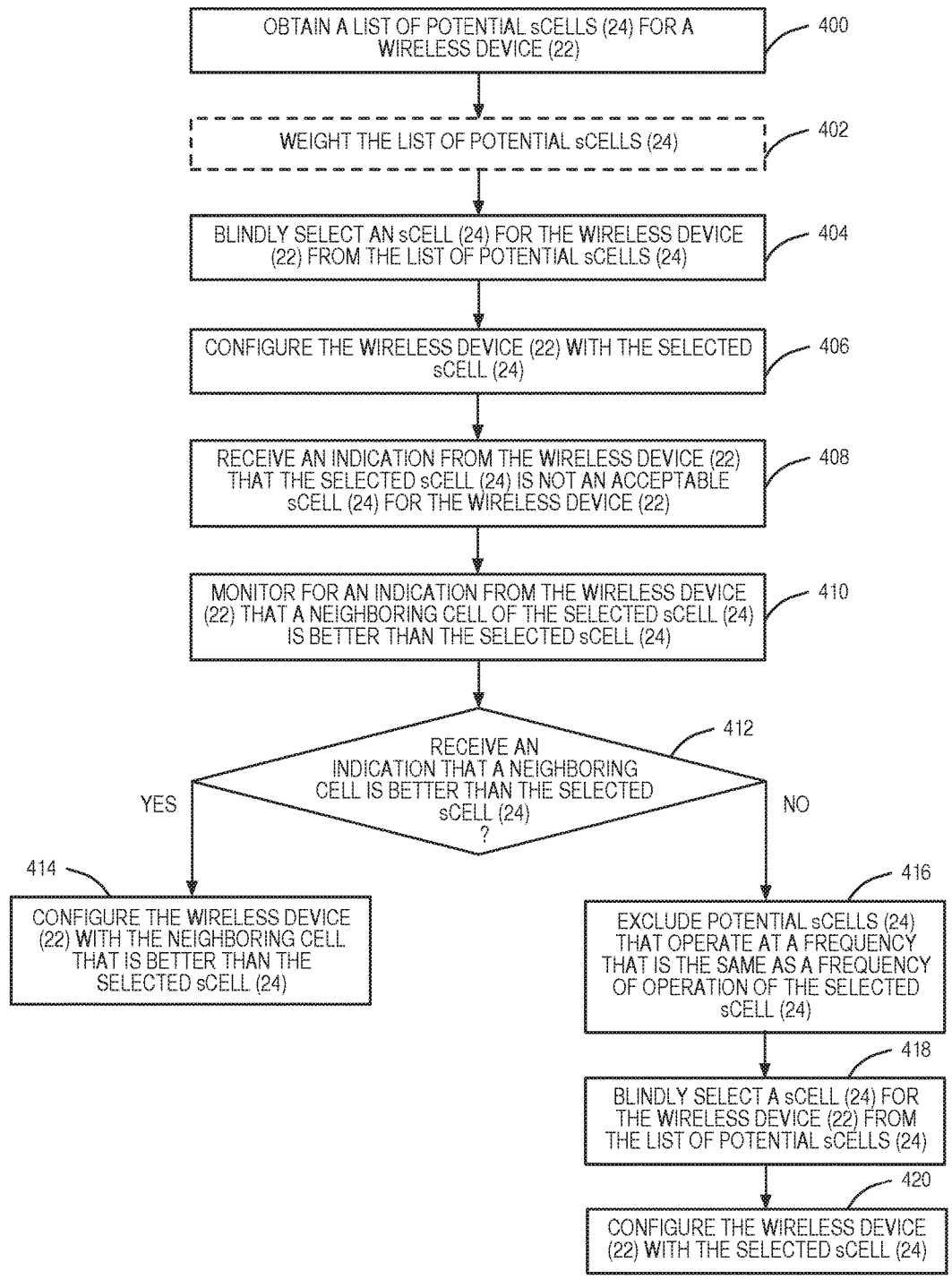
FIG. 6 illustrates the operation of a network node, including the exclusion of potential sCells that operate at a frequency that is the same as a frequency of operation of a selected sCell according to one embodiment of the present disclosure.

FIG. 6 illustrates the operation of a network node for selecting one or more of the sCells 24 for the wireless device 22 and configuring the wireless device 22 with the selected sCell(s) 24 according to another embodiment of the present disclosure. As discussed above, the network node obtains a list of potential sCells 24 for the wireless device 22 (step 400), optionally weights the list of potential sCells 24 (step 402), blindly selects an sCell 24 for the wireless device 22 from the list of potential sCells 24 (step 404), and configures the wireless device 22 with the selected sCell 24 (step 406).

After configuring the wireless device 22 with the selected sCell 24, the network node receives from, e.g., the wireless device 22 an indication that the selected sCell 24 is not an acceptable sCell 24 for the wireless device 22 (step 408). In one embodiment, the indication from the wireless device 22 that the selected sCell 24 is not an acceptable sCell 24 for the wireless device 22 is an indication of an A2 event. In another embodiment, the indication from the wireless device 22 that the selected sCell 24 is not an acceptable sCell 24 for the wireless device 22 is an indication that the wireless device 22 failed to connect to the selected sCell 24. Instead of immediately selecting a new sCell 24 with which to configure the wireless device 22, the network node monitors for an indication from the wireless device 22 that a neighboring cell of the selected sCell 24 is better than the selected sCell 24 (step 410). In one embodiment, the indication that a neighboring cell of the selected sCell 24 is better than the selected sCell 24 is an indication of an A4 event or an A6 event. Receiving either an indication of an A4 event or an indication of an A6 event alerts the network node to the presence of an sCell 24 that is acceptable, whereas the currently selected and configured sCell 24 is not acceptable.

If the network node receives an indication from the wireless device 22 that a neighboring cell of the selected sCell 24 is better than the selected sCell 24 (step 412), the network node configures the wireless device 22 with the neighboring cell that is better than the selected sCell 24 (step 414). Note that in some embodiments, the network node may first determine that the neighboring cell satisfies one or more predefined criteria for serving as an sCell 24 of the wireless device 22. Otherwise, if the network node does not receive an indication from the wireless device 22 that a neighboring cell of the selected sCell 24 is better than the selected sCell 24, e.g., within a predefined amount of time, the network node can deduce that there are no appropriate sCells 24 that operate at a frequency that is the same as the frequency of operation of the currently selected and configured sCell 24. If this deduction were not true, the network node would have received an indication from the currently selected and configured sCell 24 that a neighboring cell was better than the selected sCell 24. The network node then excludes the potential sCells 24 that operate at a frequency that is the same as a frequency of operation of the selected sCell 24 (step 416).

Next, the network node blindly selects a new sCell 24 for the wireless device 22 from the list of potential sCells 24 excluding the potential sCells 24 excluded in step 416 (step 418). As discussed above, since the network node has deduced that there are no acceptable sCells 24 with a frequency of operation that is the same as the frequency of operation of the previously configured sCell 24, this new selection excludes those sCells 24. Depending on how many sCells 24 share this frequency of operation, this exclusion can decrease the amount of time needed to find an acceptable sCell 24 by not configuring these likely unacceptable sCells 24. After blindly selecting a new sCell 24 for the wireless device 22 in step 418, the network node configures the wireless device 22 with the newly selected sCell 24 (step 420). From here, in some embodiments, the process can continue until an acceptable sCell 24 has been selected and configured.

Figure 7:
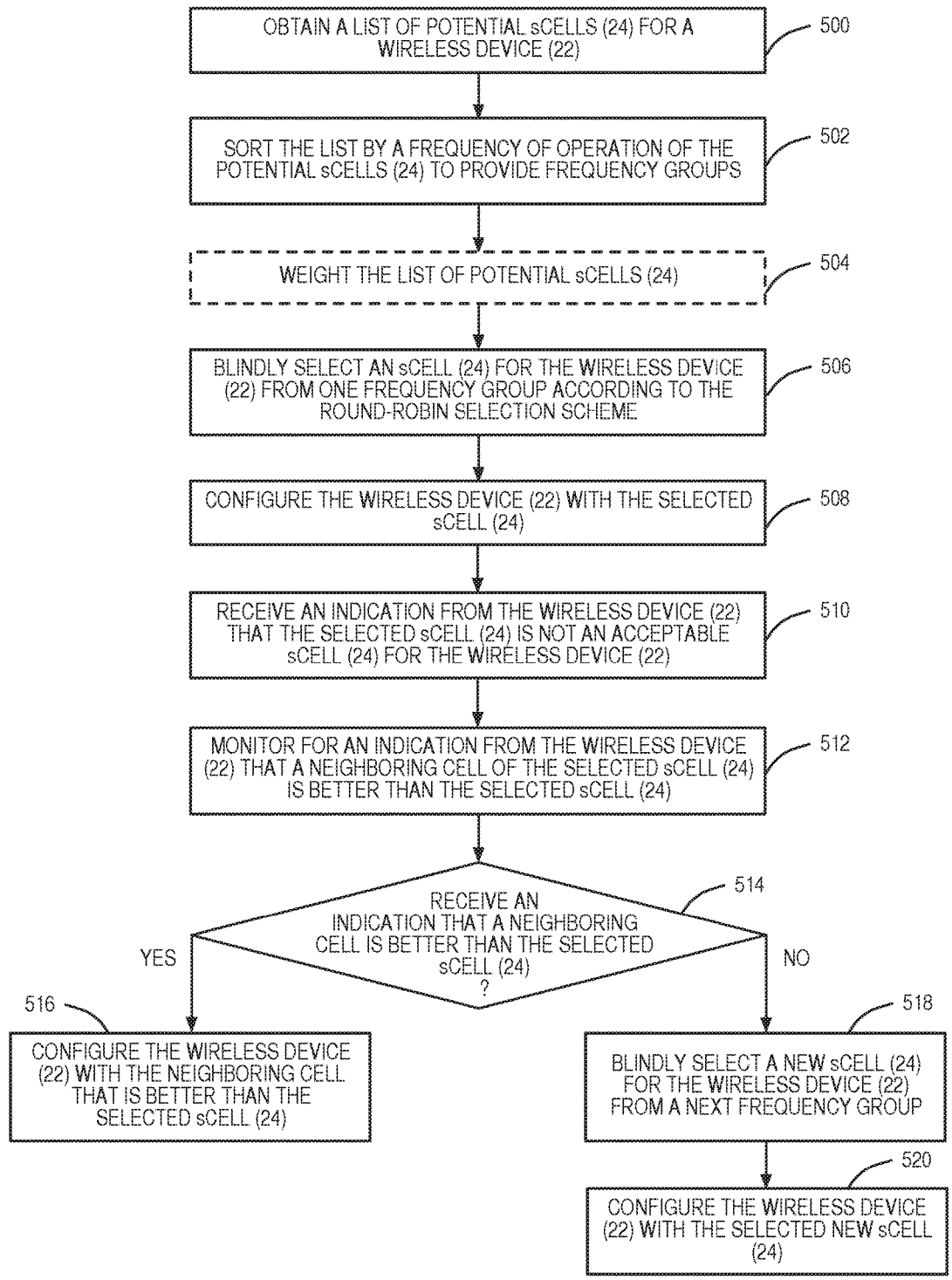
FIG. 7 illustrates the operation of a network node based on a round-robin strategy according to one embodiment of the present disclosure.

FIG. 7 illustrates the operation of a network node for selecting one or more of the sCells 24 for the wireless device 22 and configuring the wireless device 22 with the selected sCell(s) 24 according to another embodiment of the present disclosure. This embodiment is similar to that of FIG. 6, but in the embodiment of FIG. 7, one embodiment of a round-robin selection scheme is utilized.

First, the network node obtains a list of potential sCells 24, as discussed above (step 500). The network node sorts the list of potential sCells 24 by a frequency of operation of the potential sCells 24 to provide resulting frequency groups (step 502). Each frequency group includes one or more sCells 24 having the same frequency of operation and/or frequency band of operation. The sCells 24 within each frequency group can be arranged in any suitable manner. For example, if the network node has further information about a preferred order of selection for the sCells 24, that information can be used to order the sCells 24 within each frequency group.

After sorting the list of potential sCells 24, the network node may optionally weight the list of potential sCells 24 (step 504). This weighting serves to make the selection of one or more sCells 24 more likely and/or to make the selection of one or more sCells 24 less likely. In one embodiment, this weighting can include altering the order of the frequency groups or altering the order of the sCells 24 within each frequency group. The weighting could also include adding one or more duplicate entries into the list of potential sCells 24, or any other suitable method, depending on the implementation of the method.

Next, the network node blindly selects an sCell 24 for the wireless device 22 from the list of potential sCells 24 according to the round-robin selection scheme (step 506). In one embodiment, the round-robin selection scheme is started in the list of potential sCells 24 at a position in the list that is different from a position at which a previous iteration of the round-robin selection scheme for selecting a previous sCell 24 for the wireless device 22 stopped. In one embodiment, the round-robin strategy is started in the list of potential sCells 24 at a position in the list immediately succeeding a position at which a previous iteration of the round-robin strategy for selecting a previous sCell 24 for the wireless device 22 stopped. In one embodiment, the next position in the list to select is maintained as an index of the list of potential sCells 24. In this embodiment, the index can be changed to refer to the next sCell 24 in the list of potential sCells 24 after each blind selection. Starting the selection at a different position in the list avoids selecting an sCell 24 that may have recently been selected as an sCell 24 for a wireless device 22.

In some embodiments, the optional list weighting and the method of blindly selecting the next sCell 24 may be implemented to avoid the problem of load imbalancing. Load imbalancing was discussed in more detail above and occurs when relatively few potential sCells 24 are disproportionately chosen to be configured for the wireless devices 22, while other potential sCells 24 are not chosen. Weighting the list of potential sCells 24 allows the problem of load imbalancing to be avoided by increasing the possibility of choosing potential sCells 24 that are currently used less than other potential sCells 24. The converse may also be used, where the weighting decreases the possibility of choosing potential sCells 24 that are currently used more than other potential sCells 24. These are only some ways in which the list of potential sCells 24 can be weighted.

Additionally, the method of choosing the next sCell 24 to blindly select may be implemented to avoid the problem of load imbalancing. In one embodiment, if the same or a similar list of potential sCells 24 is obtained for more than one wireless device 22, the method of choosing the next sCell 24 to blindly select may choose a random sCell 24 from the list. In this way, the sCells 24 will be configured by the wireless devices 22 in a more balanced way. In an embodiment implementing a round-robin selection strategy where the next sCell 24 to blindly select is the next sCell 24 in the list of potential sCells 24, the starting point in the list of potential sCells 24 may be different for different wireless devices 22. In this way, the sCells 24 will be configured by the wireless devices 22 in a more balanced way. In another embodiment, the list of potential sCells 24 obtained for one wireless device 22 includes sCells 24 that are in an order that is different from an order of potential sCells 24 in another list of potential sCells 24 obtained by another wireless device 22. In this way the sCells 24 will be configured by the wireless devices 22 in a more balanced way.

After blindly selecting an sCell 24 for the wireless device 22, the network node configures the wireless device 22 with the selected sCell 24 (step 508). In this embodiment, after configuring the wireless device 22 with the selected sCell 24, the network node receives an indication that the selected sCell 24 is not an acceptable sCell 24 for the wireless device 22 (step 510). In one embodiment, the indication from the wireless device 22 that the selected sCell 24 is not an acceptable sCell 24 for the wireless device 22 is an indication of an A2 event. In another embodiment, the indication from the wireless device 22 that the selected sCell 24 is not an acceptable sCell 24 for the wireless device 22 is an indication that the wireless device 22 failed to connect to the sCell 24.

Instead of immediately selecting a new sCell 24 with which to configure the wireless device 22, the network node monitors for an indication from the wireless device 22 that a neighboring cell of the selected sCell 24 is better than the selected sCell 24 (step 512). In one embodiment, the indication is an indication of an A4 event or an indication of an A6 event. Receiving either an indication of an A4 event or an indication of an A6 event alerts the network node to the presence of an sCell 24 that is more acceptable than the currently configured sCell 24.

If the network node receives an indication from the wireless device 22 that a neighboring cell of the selected sCell 24 is better than the selected sCell 24 (step 514), the network node configures the wireless device 22 with the neighboring cell that is better than the selected sCell 24 (step 516). Otherwise, if the network node does not receive an indication from the wireless device 22 that a neighboring cell of the selected sCell 24 is better than the selected sCell 24 (step 514), the network node can deduce that there are no appropriate sCells 24 that operate at a frequency that is the same as the frequency of operation of the selected sCell 24. If this deduction were not true, the network node would have received an indication that a neighboring cell was better than the selected sCell 24.

The network node can now exclude the potential sCells 24 that operate at the same as a frequency of operation as the selected sCell 24. Since the list of potential sCells 24 is already sorted by a frequency of operation of the potential sCells 24 to provide frequency groups, excluding the sCells 24 can be accomplished by selecting a new sCell 24 from a different frequency group. In this regard, the network node blindly selects a new sCell 24 for the wireless device 22 from a next frequency group (step 518). In an embodiment where the next sCell 24 to select is maintained by an index of the list of potential sCells 24, the index can be advanced to the first sCell 24 in the next frequency group in the sorted list of potential sCells 24.

As discussed above, since the network node has deduced that there are no acceptable sCells 24 with a frequency of operation that is the same as the frequency of operation of the previously configured sCell 24, this new selection is an sCell 24 with a frequency of operation that is different from the frequency of operation of the previously configured sCell 24. After blindly selecting an sCell 24 for the wireless device 22 from a different frequency group, the network node configures the wireless device 22 with the newly selected sCell 24 (step 520). In some embodiments, the process continues in this manner until an acceptable sCell 24 has been selected and configured for the wireless device 22.

Figure 8:
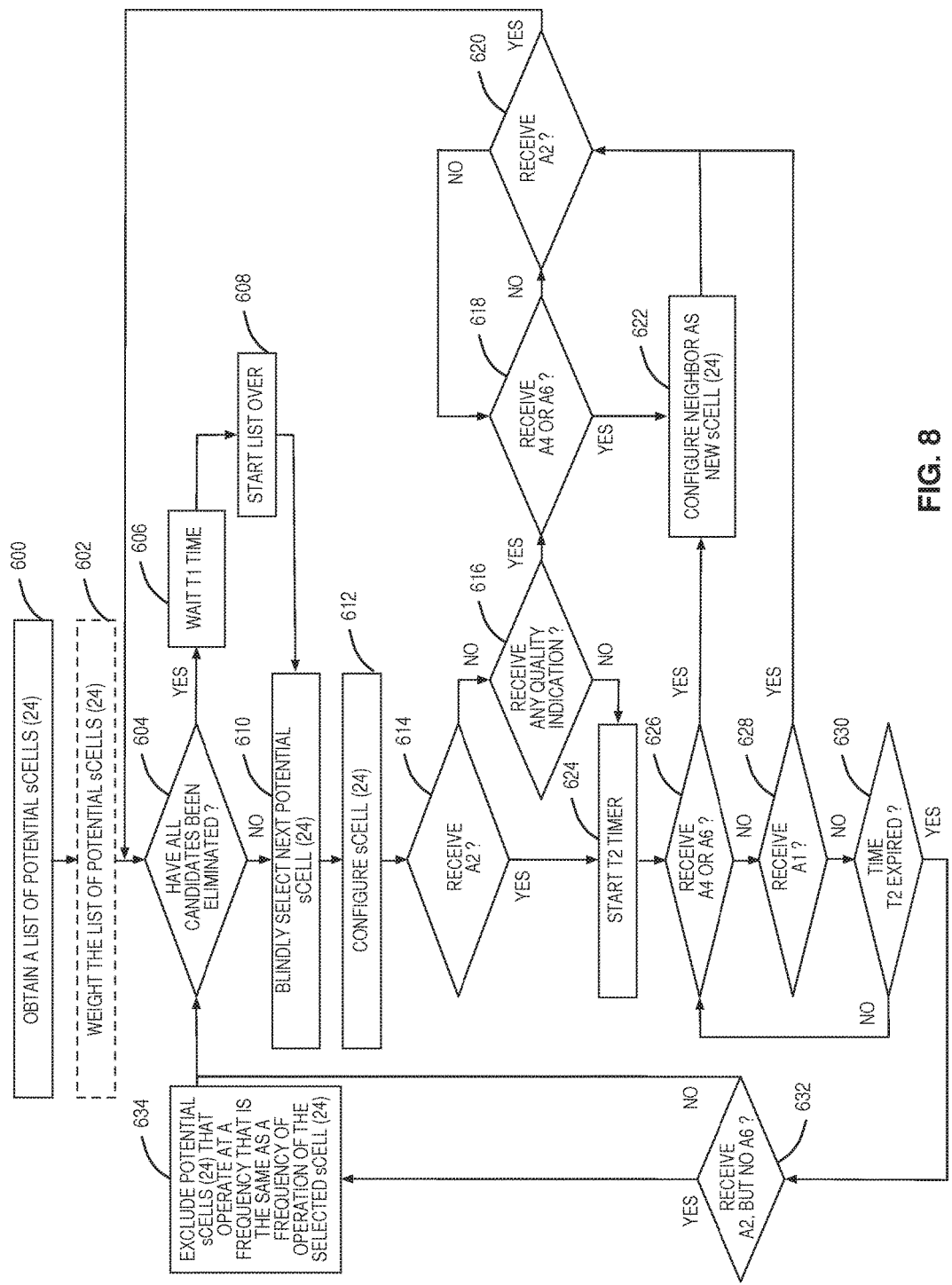
FIG. 8 illustrates the operation of a network node, including specific events according to one embodiment of the present disclosure.

FIG. 8 illustrates the operation of a network node for selecting one or more of the sCells 24 for the wireless device 22 and configuring the wireless device 22 with the selected sCell(s) 24 according to another embodiment of the present disclosure. In this embodiment, specific implementation is described which covers many of the embodiments previously discussed. For clarity and conciseness, FIG. 8 includes references to specific measurement events such as A1, A2, A4, and A6 measurement events. This is merely an exemplary implementation of one embodiment of the current disclosure. In other implementations, other measurement events or notifications could be used.

First, the network node obtains a list of potential sCells 24 (step 600). After obtaining the list of potential sCells 24, the network node may optionally weight the list of potential sCells 24 (step 602). Next, the network node checks if all candidate sCells 24 in the list of potential sCells 24 have been eliminated from consideration (step 604). If all candidate sCells 24 in the list of potential sCells 24 have been eliminated from consideration, the wireless device 22 is currently in a location without acceptable sCell 24 coverage for the wireless device 22. In order to avoid configuring the same potential sCells 24 again when the sCells 24 are unlikely to be acceptable, the network node waits for a timer T1 to expire (step 606). The timer T1 is set to a predefined amount of time, which may vary depending on the particular implementation. In one embodiment, the value of the timer T1 is determined as a tradeoff between power usage during sCell 24 selection and configuration attempts and the desirability of having an acceptable sCell 24 configured for the wireless device 22. In one embodiment, the value of the timer T1 is determined based on a mobility of the wireless device 22. For instance, the value of the timer T1 may be inversely related to the mobility of the wireless device 22 since the more mobile the wireless device 22 is, the more likely the wireless device 22 will enter a location with an acceptable sCell 24. After waiting for the timer T1 to expire, the network node restarts the sCell selection process at a desired location in the list of potential sCells 24 (which may be potentially weighted according to step 602) (step 608). The network node may restart the sCell selection process from any desired position in the list of potential sCells 24. For example, the network node may restart the sCell selection process at a position in the list of potential sCells 24 at which the sCell selection process was previously started before eliminating all of the sCells 24 from consideration.

At this point, whether proceeding from step 604 (all candidate sCells 24 in the list of potential sCells 24 have not been eliminated from consideration) or step 608 (restarting the list), the network node blindly selects an sCell 24 for the wireless device 22 from the list of potential sCells 24 (step 610). As discussed above, in one embodiment, the blind selection may be according to a round-robin selection scheme. However, other blind selection schemes, e.g., random selection, may be used. After blindly selecting an sCell 24 for the wireless device 22, the network node configures the wireless device 22 with the selected sCell 24 (step 612).

After configuring the wireless device 22 with the selected sCell 24, the network node determines whether an indication of an A2 event has been received from the wireless device 22 (step 614). In the LTE specifications, an A2 event occurs when a serving cell, which in this case is the selected and configured sCell 24, becomes worse than an A2 threshold. Receiving an indication of an A2 event means that the selected and configured sCell 24 is not an acceptable sCell 24 for the wireless device 22. Conversely, if an indication of an A2 event is not received, means one of two conditions exist, namely: (1) the selected and configured sCell 24 is an acceptable sCell 24 for the wireless device 22, or (2) for some reason, the network node has not and will not receive an indication of any event (A1, A2, A4, or A6) from the wireless device 22 for the selected and configured sCell 24.

In order to determine which of these two conditions exists, if the network node does not receive an A2 event, the network node checks whether any quality indication has been received from the wireless device 22 regarding the selected sCell 24 (step 616). In one embodiment, the quality indication is an indication of an A1 event, an indication of an A4 event, or an indication of an A6 event. In the LTE specifications, an A1 event occurs when the selected sCell 24 becomes better than a threshold, which is referred to herein as an A1 threshold.

If the network node does not receive an A2 event, but does receive some other quality indication from the wireless device 22 regarding the selected sCell 24, the selected sCell 24 is considered an acceptable sCell 24 for the wireless device 22. In this case, the network node enters a loop where the network node monitors the wireless device 22 to determine whether the selected and configured sCell 24 subsequently becomes non-acceptable or a better neighbor cell becomes available. More specifically, in this embodiment, the network node determines whether an indication of an A4 or an A6 event has been received from the wireless device 22 for the selected and configured sCell 24 (step 618). Receiving an indication of either an A4 event or an A6 event alerts the network node to the presence of a neighboring cell of the currently selected and configured sCell 24 that is better than the currently selected and configured sCell 24.

If an indication of an A4 event or an A6 event has not been received, the network node determines whether an indication of an A2 event has been received from the wireless device 22 for the currently configured and selected sCell 24 (step 620). If an indication of an A2 event has been received, the process returns to step 604 and is repeated for selection of a new sCell 24 for the wireless device 22. Notably, at this point, the previously selected and configured sCell 24 may be deconfigured. If an indication of an A2 event has not been received, the process returns to step 618. At step 618, if the network node receives an indication of either an A4 event or an A6 event, the network node configures the wireless device 22 with the neighboring cell that is better than the selected sCell 24 (step 622). In other words, the neighboring cell is selected and configured as a new sCell 24 for the wireless device 22. In some embodiments, the previously selected and configured sCell 24 may be deconfigured. From step 622, the process proceeds to step 620 and is performed for the newly selected and configured sCell 24 of the wireless device 22.

Returning now to the discussion of steps 614 and 616, if the network node does receive an indication of an A2 event from the wireless device 22 for the selected and configured sCell 24, or if the network node did not receive any quality indication from the wireless device 22 regarding the sCell 24 in step 616, the network node starts a timer T2 (step 624). In one embodiment, the timer T2 is intended to allow for more information about the configured sCell 24 to be received from the wireless device 22. As with the previously described timer T1, the duration of the timer T2 may be implementation-specific. A larger value for the timer T2 leaves the wireless device 22 configured with an unacceptable sCell 24 for a longer time. In contrast, a smaller value for the timer T2 may cause the network node to miss one or more additional measurement reports that the wireless device 22 might have sent regarding the selected and configured sCell 24. A balance between these two factors will be implementation-specific and may depend on the network architecture, capabilities of the wireless device 22, or any other factor.

While the timer T2 is running and before the timer T2 expires, the network node determines whether an indication of either an A4 event or an A6 event has been received from the wireless device 22 for the selected and configured sCell 24 (step 626). If the network node receives an indication of either an A4 event or an A6 event, the network node configures the wireless device 22 with the neighboring cell that is better than the selected sCell 24 (step 622). Otherwise, the network node determines whether an indication of an A1 event has been received from the wireless device 22 for the currently selected and configured sCell 24 (step 628). Receiving an indication of an A1 event indicates that the sCell 24 is now an acceptable sCell 24 for the wireless device 22. If the network node does receive an indication of an A1 event, the network node considers the sCell 24 to now be acceptable, and the process proceeds to step 620.

If no measurement reports are received in steps 626 and 628, the network node determines whether the timer T2 has expired (step 630). If the timer T2 has not expired, the process returns to step 626 such that steps 626 and 628 are repeated to continue to monitor for either an A4 or A6 event, or for an A1 event. Once the timer T2 has expired, the network node determines whether an A2 event was received but an A6 event was not received (step 632). If an A2 event was received but an A6 event was not received, the network node can deduce that there are no appropriate sCells 24 that operate at the same frequency of operation as the currently selected and configured sCell 24. If this deduction were not true, there should have been an indication that the neighboring cell was better than the selected sCell 24. Thus, if an indication of an A2 event was received but an indication of an A6 event was not received, the network node excludes the potential sCells 24 that operate at a frequency that is the same as a frequency of operation of the selected sCell 24 (step 634). In some embodiments where the list of potential sCells 24 is sorted by frequency of operation of the sCells 24 (e.g., in an embodiment of a round-robin selection strategy), excluding the potential sCells 24 that operate at a frequency that is the same as a frequency of operation of the selected sCell 24 may involve advancing the selection process to a point in the list where sCells 24 operating at a different frequency are located.

Whether or not the network node skips to the next frequency in the list of potential sCells 24, the process returns to step 604, where the network node checks if all candidate sCells 24 in the list of potential sCells 24 have been eliminated from consideration. The process continues in this manner.

Figure 9:
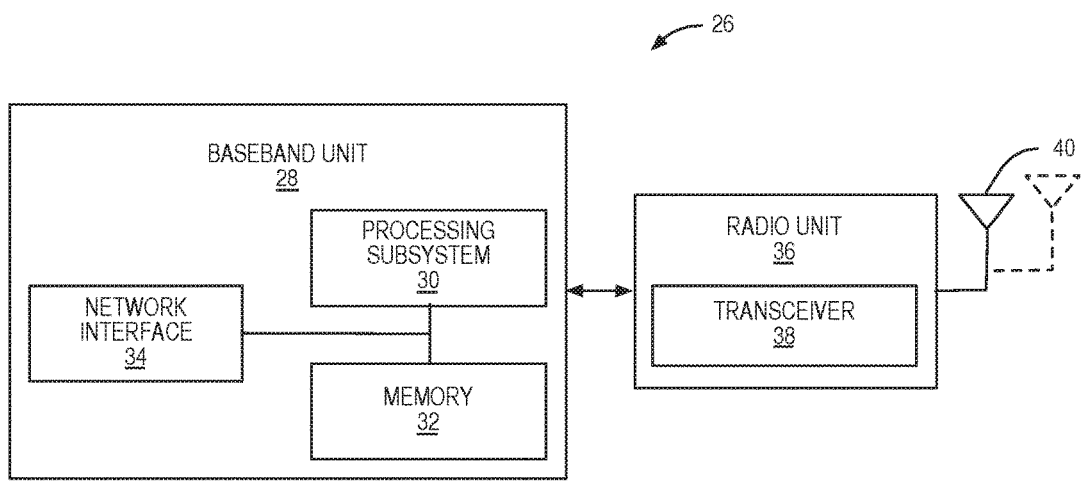
FIG. 9 is a block diagram of a network node according to one embodiment of the present disclosure.

FIG. 9 is a block diagram of a radio access node 26 (e.g., the base station 16) according to one embodiment of the present disclosure. As illustrated, the radio access node 26 includes a baseband unit 28 including a processing subsystem 30, memory 32, and a network interface 34, and a radio unit 36 including a transceiver 38 connected to one or more antennas 40. The transceiver 38 generally includes analog and, in some embodiments, digital components for wirelessly sending and receiving data to and from the wireless devices 22 (not shown). From a wireless communications protocol view, the transceiver 38 implements at least part of Layer 1 (i.e., the Physical or "PHY" Layer).

The processing subsystem 30 generally implements any remaining portion of Layer 1 not implemented by the transceiver 38, as well as functions for higher layers in the wireless communications protocol (e.g., Layer 2 (data link layer), Layer 3 (network layer), etc.). In particular embodiments, the processing subsystem 30 may comprise, for example, one or several general-purpose or special-purpose microprocessors or other microcontrollers programmed with suitable software and/or firmware to carry out some or all of the functionality of the base station 16 described herein. In addition or alternatively, the processing subsystem 30 may comprise various digital hardware blocks (e.g., one or more Application Specific Integrated Circuits (ASICs), one or more off-the-shelf digital and analog hardware components, or a combination thereof) configured to carry out some or all of the functionality of the base station 16 described herein. Additionally, in particular embodiments, the above-described functionality of the radio access node 26 may be implemented, in whole or in part, by the processing subsystem 30 executing software or other instructions stored on a non-transitory computer-readable medium such as, for example, the memory 32 or any other suitable type of data storage component(s).

Figure 10:
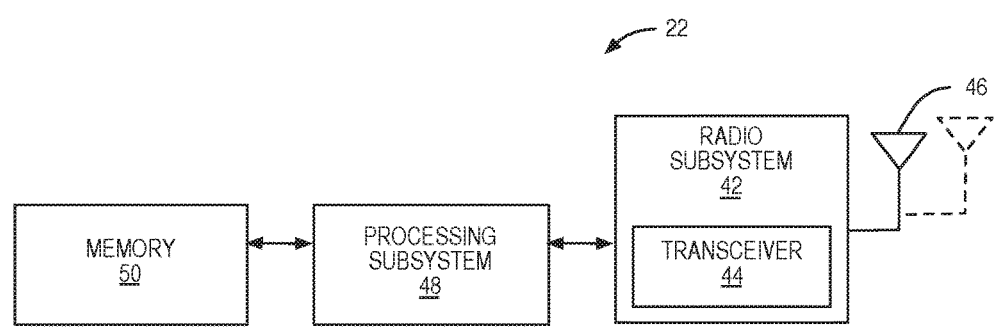
FIG. 10 is a block diagram of a wireless device according to one embodiment of the present disclosure.

FIG. 10 is a block diagram of a wireless device 22 according to one embodiment of the present disclosure. As illustrated, the wireless device 22 includes a radio subsystem 42 including a transceiver 44 connected to one or more antennas 46, a processing subsystem 48, and memory 50. The transceiver 44 generally includes analog and, in some embodiments, digital components for wirelessly sending and receiving data to and from the base station 16 and the RRHs 18 (shown in FIG. 2). From a wireless communications protocol view, the transceiver 44 implements at least part of Layer 1 (i.e., the Physical or "PHY" Layer).

The processing subsystem 48 generally implements any remaining portion of Layer 1 not implemented by the radio subsystem 42, as well as functions for higher layers in the wireless communications protocol (e.g., Layer 2 (data link layer), Layer 3 (network layer), etc.). In particular embodiments, the processing subsystem 48 may comprise, for example, one or several general-purpose or special-purpose microprocessors or other microcontrollers programmed with suitable software and/or firmware to carry out some or all of the functionality of the wireless device 22 described herein. In addition or alternatively, the processing subsystem 48 may comprise various digital hardware blocks (e.g., one or more ASICs, one or more off-the-shelf digital and analog hardware components, or a combination thereof) configured to carry out some or all of the functionality of the wireless device 22 described herein. Additionally, in particular embodiments, the above-described functionality of the wireless device 22 may be implemented, in whole or in part, by the processing subsystem 48 executing software or other instructions stored on a non-transitory computer-readable medium, such as the memory 50 or any other suitable type of data storage component(s).

Figure 11:
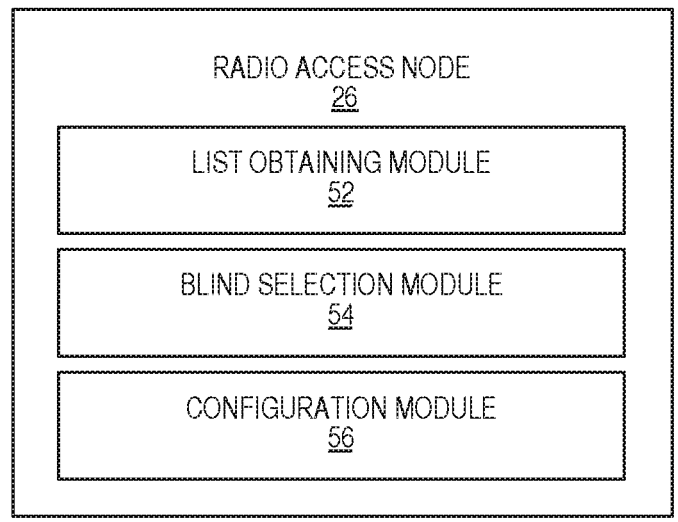
FIG. 11 is a block diagram of a radio access node for configuring a wireless device with an sCell according to one embodiment of the present disclosure.

FIG. 11 is a block diagram of a radio access node 26 for configuring a wireless device 22 (not shown) with an sCell 24 (not shown) according to one embodiment of the present disclosure. As illustrated, the radio access node 26 includes a list obtaining module 52, a blind selection module 54, and a configuration module 56 that are each implemented in software that, when executed by a processor of the radio access node 26, causes the radio access node 26 to operate according to any one of the embodiments described herein. The list obtaining module 52 operates to provide the functionality of the radio access node 26 with respect to steps 100, 200, 300, 400, 500, or 600 described above. Likewise, the blind selection module 54 operates to provide the functionality of the radio access node 26 with respect steps 104, 204, 304, 404, 418, 506, 518, or 610 described above. The configuration module 56 operates to provide the functionality of the radio access node 26 with respect to steps 106, 206, 210, 212, 306, 406, 414, 420, 508, 516, 520, 612, or 620 described above.

In one embodiment, a computer program including instructions which, when executed by at least one processor, causes the at least one processor to carry out the functionality of the radio access node 26 according to any one of the embodiments described herein. In one embodiment, a carrier containing the aforementioned computer program product is provided. The carrier is one of an electronic signal, an optical signal, a radio signal, or a computer-readable storage medium (e.g., a non-transitory computer-readable medium such as the memory 32 shown in FIG. 9).

While the embodiments described herein provide numerous advantages, in some example implementations, at least some of the embodiments provide the advantage of configuring a wireless device 22 with an sCell 24 that is blindly selected, eliminating the need for measurement gaps that can cause a lack of throughput. Note, however, that this advantage is just an example and is not intended to limit the scope of the embodiments disclosed herein.

The following acronyms are used throughout this disclosure.

3GPP 3rd Generation Partnership Project
ASIC Application Specific Integrated Circuit
CC Component Carrier
eNB evolved Node B
L3 inter-frequency Layer 3
LTE Long Term Evolution
LTE Rel-8 Long Term Evolution Release 8
LTE Rel-10 Long Term Evolution Release 10
MHz Megahertz
PCC Primary Component Carrier
pCell Primary Cell
RRC Radio Resource Control
RRH Remote Radio Head
RSRP Reference Signal Received Power
SCC Secondary Component Carrier
sCell Secondary Cell Those skilled in the art will recognize improvements and modifications to the preferred embodiments of the present disclosure. All such improvements and modifications are considered within the scope of the concepts disclosed herein and the claims that follow.

What is claimed is:

1. A method of operating a network node comprising:
   obtaining a list of potential secondary cells for a wireless device;
   blindly selecting a secondary cell for the wireless device from the list of potential secondary cells;
   configuring the wireless device with the selected secondary cell;
   receiving an indication from the wireless device that the selected secondary cell is not an acceptable secondary cell for the wireless device;
   monitoring for an indication from the wireless device that a neighboring cell of the selected secondary cell is better than the selected secondary cell;
   if the indication that the neighboring cell of the selected secondary cell is better than the selected secondary cell is not received within a defined period of time, blindly selecting a new secondary cell for the wireless device from the list of potential secondary cells for the wireless device, and configuring the wireless device with the new secondary cell selected for the wireless device.

2. The method of claim 1 wherein blindly selecting the secondary cell comprises selecting the secondary cell from the list of potential secondary cells based on a round-robin strategy.

3. The method of claim 2 wherein blindly selecting the secondary cell from the list of potential secondary cells based on the round-robin strategy comprises starting the round-robin strategy in the list of potential secondary cells at a position in the list of potential secondary cells that is different from a position at which a previous iteration of the round-robin strategy for selecting a previous secondary cell stopped.

4. The method of claim 2 wherein blindly selecting the secondary cell from the list of potential secondary cells based on the round-robin strategy comprises starting the round-robin strategy in the list of potential secondary cells at a position in the list of potential secondary cells immediately succeeding a position at which a previous iteration of the round-robin strategy for selecting a previous secondary cell stopped.

5. The method of claim 1 wherein blindly selecting the secondary cell comprises selecting the secondary cell from the list of potential secondary cells based on a random selection strategy.

6. The method of claim 1 further comprising, if the indication that the neighboring cell of the selected secondary cell is better than the selected secondary cell is received within the defined period of time, configuring the wireless device with the neighboring cell as a secondary cell for the wireless device.

7. The method of claim 1 wherein receiving the indication from the wireless device that the selected secondary cell is not an acceptable secondary cell for the wireless device comprises receiving an indication of an A2 event from the wireless device, and monitoring for the indication from the wireless device that the neighboring cell of the selected secondary cell is better than the selected secondary cell comprises monitoring for at least one of an indication of an A4 event and an indication of an A6 event.

8. The method of claim 1 wherein obtaining the list of potential secondary cells comprises determining the list based on an intersection of cells available to be configured as a secondary cell and capabilities of the wireless device.

9. The method of claim 8 wherein determining the list based on the intersection of the cells available to be configured as a secondary cell and the capabilities of the wireless device comprises determining the list based on an intersection of a frequency of operation of the cells available to be configured as a secondary cell and frequency capabilities of the wireless device.

10. The method of claim 1 further comprising weighting the list of potential secondary cells before blindly selecting the secondary cell.

11. A network node for configuring a wireless device with a secondary cell, the network node comprising a processor and a memory, the memory containing instructions executable by the processor, whereby the network node is operative to:
   obtain a list of potential secondary cells for the wireless device;
   blindly select a secondary cell for the wireless device from the list of potential secondary cells;
   configure the wireless device with the selected secondary cell;
   receive an indication from the wireless device that the selected secondary cell is not an acceptable secondary cell for the wireless device;
   monitor for an indication from the wireless device that a neighboring cell of the selected secondary cell is better than the selected secondary cell;
   if the indication that the neighboring cell of the selected secondary cell is better than the selected secondary cell is not received within a defined period of time, blindly select a new secondary cell for the wireless device from the list of potential secondary cells for the wireless device, and configure the wireless device with the new secondary cell selected for the wireless device.

12. The network node of claim 11 wherein, in order to blindly select the secondary cell, the network node is operable to select the secondary cell from the list of potential secondary cells based on a round-robin strategy.

13. The network node of claim 12 wherein, in order to blindly select the secondary cell from the list of potential secondary cells based on the round-robin strategy, the network node is operative to start the round-robin strategy in the list of potential secondary cells at a position in the list of potential secondary cells that is different from a position at which a previous iteration of the round-robin strategy for selecting a previous secondary cell stopped.

14. The network node of claim 12 wherein, in order to blindly select the secondary cell from the list of potential secondary cells based on the round-robin strategy, the network node is operative to start the round-robin strategy in the list of potential secondary cells at a position in the list of potential secondary cells immediately succeeding a position at which a previous iteration of the round-robin strategy for selecting a previous secondary cell stopped.

15. The network node of claim 11 wherein, in order to blindly select the secondary cell, the network node is operative to select the secondary cell from the list of potential secondary cells based on a random selection strategy.

16. The network node of claim 11 further operative to, if the indication that the neighboring cell of the selected secondary cell is better than the selected secondary cell is received within the defined period of time, configure the wireless device with the neighboring cell as a secondary cell for the wireless device.

17. The network node of claim 11 wherein, in order to receive the indication from the wireless device that the selected secondary cell is not an acceptable secondary cell for the wireless device, the network node is operative to receive an indication of an A2 event from the wireless device, and, in order to monitor for the indication from the wireless device that the neighboring cell of the selected secondary cell is better than the selected secondary cell, the network node is operative to monitor for at least one of an indication of an A4 event and an indication of an A6 event.

18. The network node of claim 11 wherein, in order to obtain the list of potential secondary cells, the network node is operative to determine the list based on an intersection of cells available to be configured as a secondary cell and capabilities of the wireless device.

19. The network node of claim 18 wherein, in order to determine the list based on the intersection of the cells available to be configured as a secondary cell and the capabilities of the wireless device, the network node is operative to determine the list based on an intersection of a frequency of operation of the cells available to be configured as a secondary cell and frequency capabilities of the wireless device.

20. The network node of claim 11 further operative to weight the list of potential secondary cells before blindly selecting the secondary cell.

* * * * *